(12) United States Patent
Niu et al.

(10) Patent No.: US 12,144,023 B2
(45) Date of Patent: Nov. 12, 2024

(54) CONFIGURING LISTEN BEFORE TALK AND SHORT CONTROL SIGNALING IN UNLICENSED SPECTRUM

(71) Applicant: Apple Inc., Cupertino, CA (US)

(72) Inventors: Huaning Niu, San Jose, CA (US); Dawei Zhang, Saratoga, CA (US); Xiang Chen, Campbell, CA (US); Yang Tang, San Jose, CA (US); Jie Cui, San Jose, CA (US); Manasa Raghavan, Sunnyvale, CA (US); Qiming Li, Beijing (CN); Oghenekome Oteri, San Diego, CA (US); Wei Zeng, Saratoga, CA (US); Haitong Sun, Cupertino, CA (US); Hong He, San Jose, CA (US); Yushu Zhang, Beijing (CN); Weidong Yang, San Diego, CA (US); Sigen Ye, Whitehouse Station, NJ (US)

(73) Assignee: Apple Inc., Cupertino, CA (US)

( * ) Notice: Subject to any disclaimer, the term of this patent is extended or adjusted under 35 U.S.C. 154(b) by 513 days.

(21) Appl. No.: 17/438,242

(22) PCT Filed: Jul. 22, 2021

(86) PCT No.: PCT/CN2021/107923
§ 371 (c)(1),
(2) Date: Sep. 10, 2021

(87) PCT Pub. No.: WO2023/000269
PCT Pub. Date: Jan. 26, 2023

(65) Prior Publication Data
US 2023/0337277 A1 Oct. 19, 2023

(51) Int. Cl.
*H04W 74/0808* (2024.01)
(52) U.S. Cl.
CPC .............................. *H04W 74/0808* (2013.01)

(58) Field of Classification Search
None
See application file for complete search history.

(56) References Cited

U.S. PATENT DOCUMENTS

| | | | |
|---|---|---|---|
| 2015/0215856 A1* | 7/2015 | Kim | H04W 48/16 370/252 |
| 2016/0043841 A1* | 2/2016 | Lunttila | H04L 5/0048 370/280 |

(Continued)

FOREIGN PATENT DOCUMENTS

| | | |
|---|---|---|
| CN | 106031112 A | 10/2016 |
| CN | 106992804 A | 7/2017 |

(Continued)

OTHER PUBLICATIONS

International Search Report and Written Opinion for PCT/CN2021/107923; 9 pages; Apr. 28, 2022.

(Continued)

*Primary Examiner* — Alex Skripnikov
(74) *Attorney, Agent, or Firm* — Kowert, Hood, Munyon, Rankin & Goetzel, P.C.

(57) ABSTRACT

This disclosure relates to techniques for configuring listen before talk and short control signaling in unlicensed spectrum in a wireless communication system. A wireless device may establish a wireless link with a cellular base station on a cell in unlicensed spectrum. The wireless device may receive listen-before-talk configuration information, where the listen-before-talk configuration information indicates whether listen-before-talk is configured for the wireless link. The wireless device may receive short control signaling configuration information, where the short control signaling configuration information indicates whether short control signaling is enabled for one or more types of control signaling. The wireless device may perform short control signaling with the cellular base station on the wireless link (Continued)

when short control signaling is enabled. The short control signaling performed between the cellular base station and the wireless device may include either or both of uplink transmissions or downlink transmissions.

20 Claims, 3 Drawing Sheets

(56) References Cited

U.S. PATENT DOCUMENTS

| | | | |
|---|---|---|---|
| 2016/0050004 A1 | 2/2016 | Mallik et al. | |
| 2017/0332264 A1* | 11/2017 | Mo | H04W 24/08 |
| 2024/0057159 A1* | 2/2024 | Calcev | H04W 48/16 |
| 2024/0114512 A1* | 4/2024 | Lunttila | H04W 72/1268 |

FOREIGN PATENT DOCUMENTS

| | | |
|---|---|---|
| CN | 105636108 | 7/2020 |
| WO | 2016041578 | 3/2016 |

OTHER PUBLICATIONS

Qualcomm "SR for NR-based Access to Unlicensed Spectrum"; Europe Inc RP-201833; 3GPP TSG RAN Meeting #89e; Sep. 7, 2020.
Extended European Search Report for EP Patent No. 21899292.3; 9 pages; Oct. 24, 2022.
Qualcomm Inc "FL summary for channel access mechnism for 52.6GHz-71GHz band, ver #7"; 3GPP TSG RAN WG1 Meeting #103-e R1-2009626; 104 pages; Oct. 26, 2020.
Mediateck Inc "DRS Enhancements for LAA"; 3GPP TSG RAN WG1 Meeting #81 R1-153258; Fukuoka, Japan; 4 pages; May 25, 2015.

* cited by examiner

CONFIGURING LISTEN BEFORE TALK AND SHORT CONTROL SIGNALING IN UNLICENSED SPECTRUM

PRIORITY CLAIM INFORMATION

This application is a U.S. National Stage application of International Application No. PCT/CN2021/107923, filed Jul. 22, 2021, titled "Configuring Listen Before Talk and Short Control Signaling in Unlicensed Spectrum", which is hereby incorporated by reference in its entirety.

The present application relates to wireless communications, and more particularly to systems, apparatuses, and methods for configuring listen before talk and short control signaling in unlicensed spectrum in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for configuring listen before talk and short control signaling in unlicensed spectrum in a wireless communication system.

The techniques described herein may include techniques for signaling whether listen before talk is configured for a given cell that operates in unlicensed spectrum. Such techniques may be helpful for identifying whether the cell operates in a region in which listen before talk is mandated for communication in unlicensed spectrum, whether listen before talk is not mandated but is enabled, or whether listen before talk is not enabled. For scenarios in which listen before talk is enabled, techniques for configuring listen before talk for each of downlink communications and uplink communications, potentially including supporting configuration of listen before talk only for selected uplink communications (e.g., as can be dynamically determined on a per-wireless-device basis), are also provided.

Additionally, techniques are described herein for indicating a short control signaling configuration. Such techniques may include support for indicating whether each of various possible types of reference signals are configured to be transmitted as short control signaling (and thus potentially without a listen before talk procedure being required before transmission), whether certain reference signal resources are configured to be transmitted as short control signaling, and/or for providing any of a variety of other possible configuration information relating to use of short control signaling in a cellular communication system.

At least according to some embodiments, these techniques may increase network configuration flexibility in unlicensed spectrum by providing additional configuration options with respect to listen before talk configurations and/or short control signaling configurations. This increased network configuration flexibility with respect to these features may potentially increase the spectrum use efficiency, reduce wireless device power consumption, and/or provide any of variety of other possible benefits.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
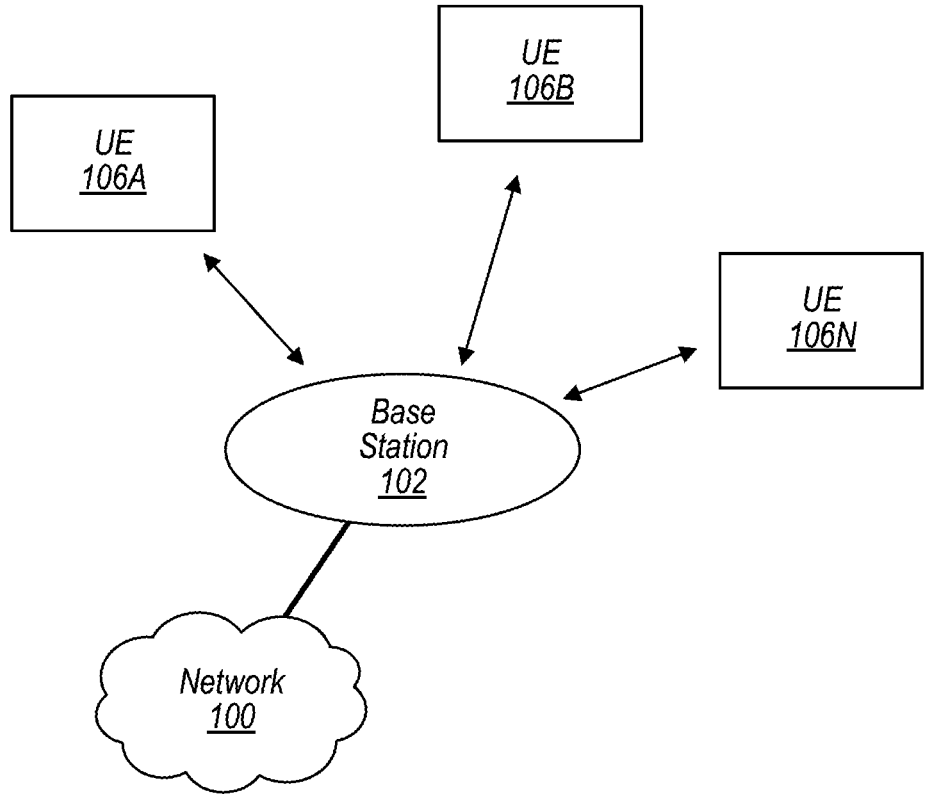
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
LBT: Listen Before Talk
CSI: Channel State Information
RS: Reference Signal
CSI-RS: Channel State Information Reference Signals
CSI-IM: Channel State Information Interference Management
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE)(or "UE Device")—any of various types of computer systems or devices that are mobile or portable and that perform wireless communications. Examples of UE devices include mobile telephones or smart phones (e.g., iPbone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device. e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
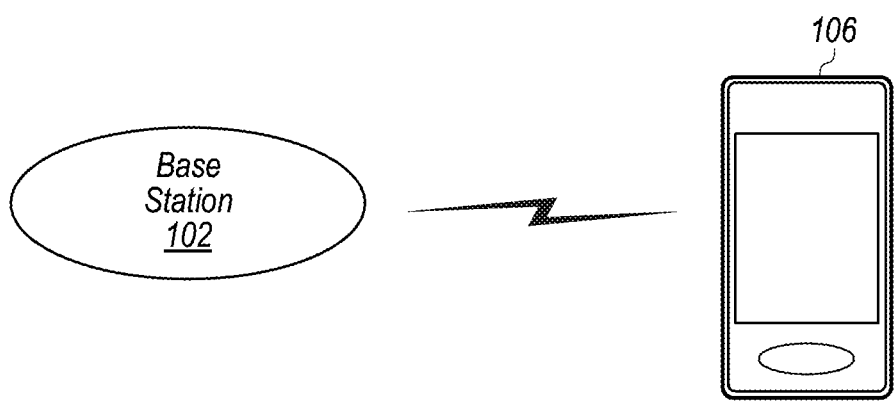
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for configuring listen before talk and short control signaling in unlicensed spectrum in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) ae also possible.

FIG. 2 illustrates an exemplary user equipment 106 (e.g., one of the devices 10A through 10N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 10 may include a processor (processing element) that is configured to execute program instructions stored in memory. The UE 106 may perform any of the method embodiments described herein by executing such stored instructions. Alternatively, or in addition, the UE 10 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 10 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
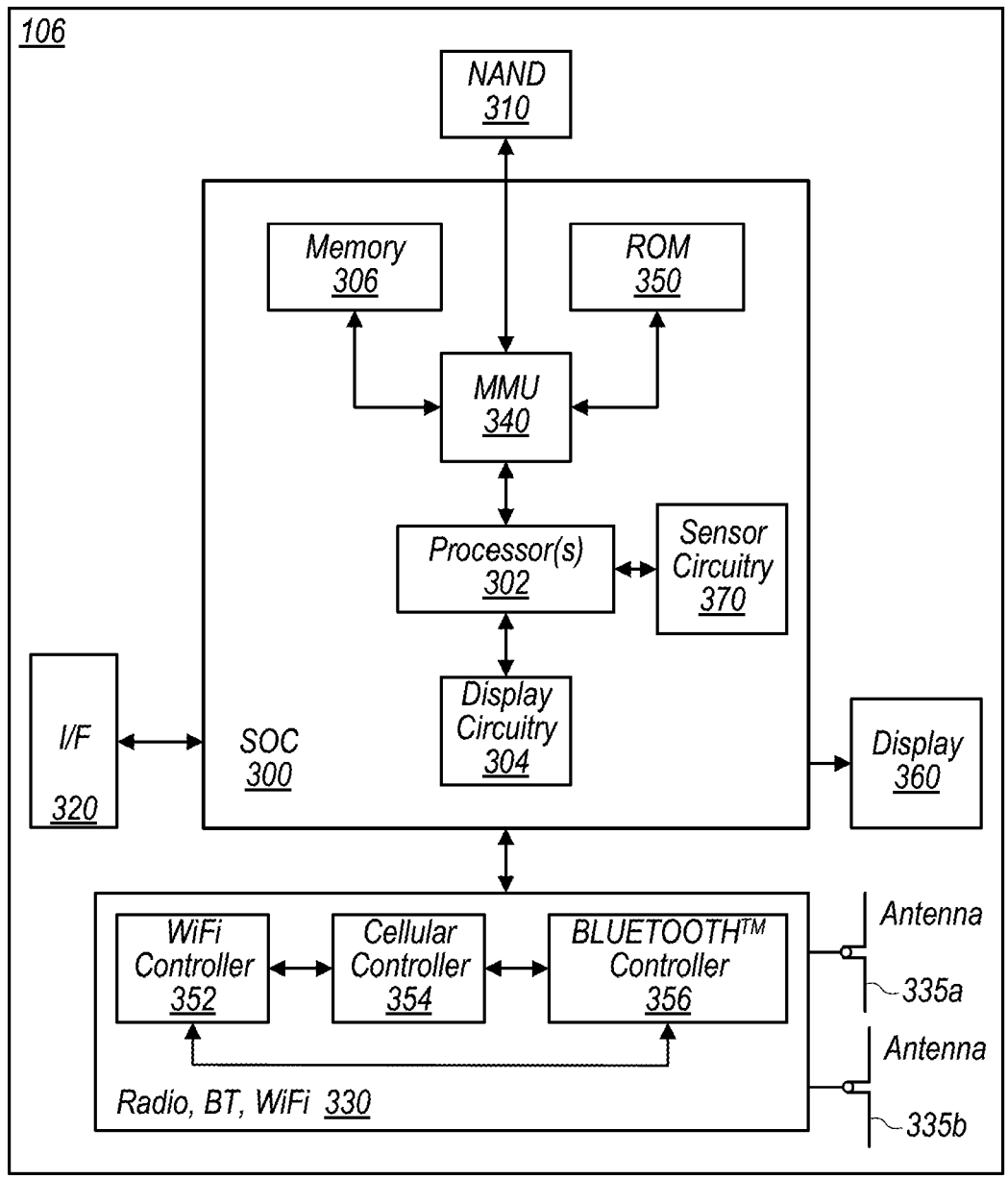
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The U E 106 may include hardware and software components for implementing methods for the UE 106 to perform techniques for configuring listen before talk and short control signaling in unlicensed spectrum in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for configuring listen before talk and short control signaling in unlicensed spectrum in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different R ATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
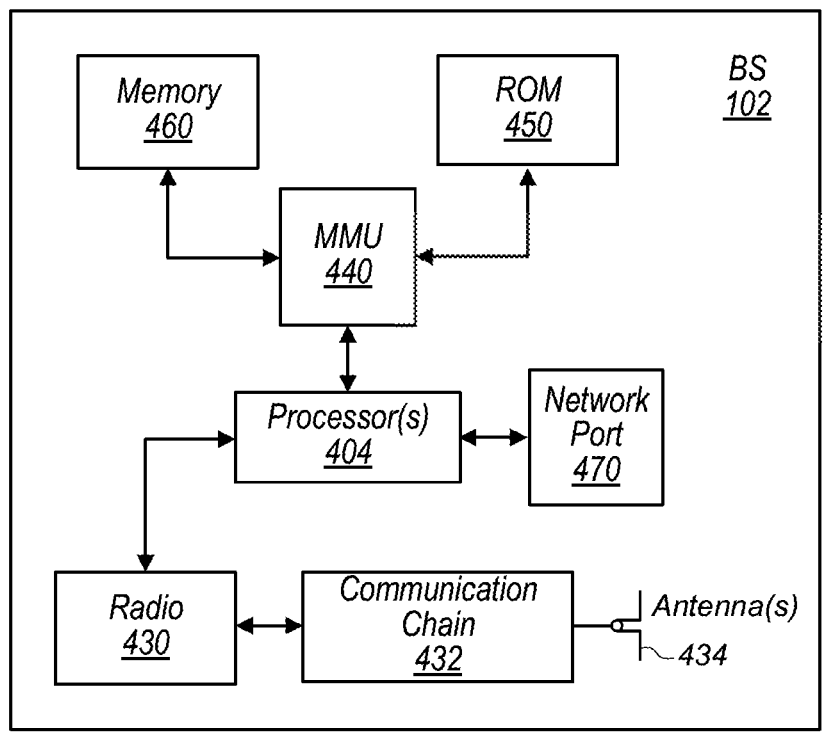
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

REFERENCE SIGNALS

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RD, a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel. e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains. e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
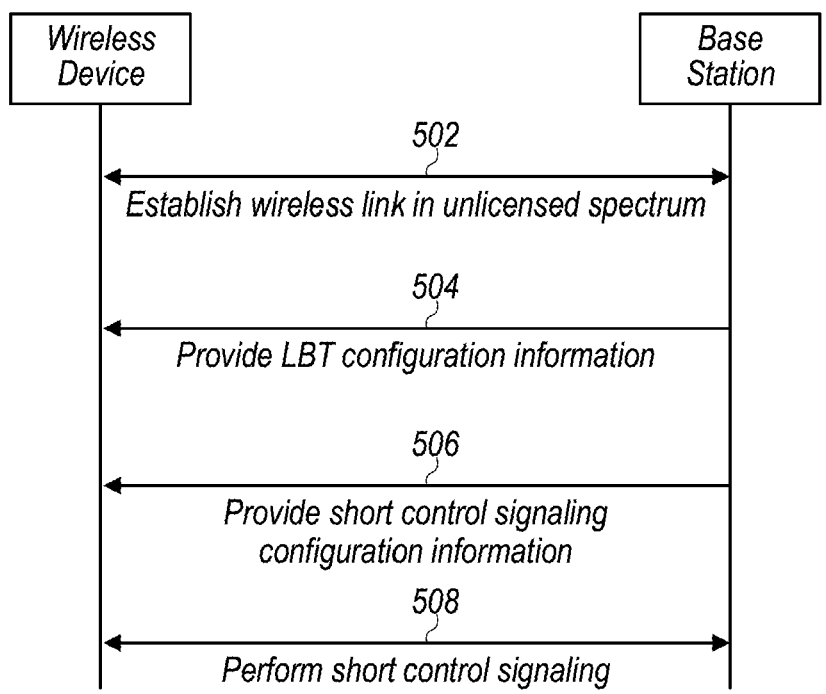
FIG. 5 is a flowchart diagram illustrating aspects of an exemplary possible method for providing listen before talk and short control signaling configuration information in a wireless communication system, according to some embodiments.

FIG. 5—Configuring Listen Before Talk and Short Control Signaling in Unlicensed Spectrum Cellular communication techniques may include techniques for performing cellular communication both in licensed and in unlicensed frequency bands. In unlicensed bands, medium access may be contended for by multiple parties, which may wish to perform wireless communication according to the same or different wireless communication technologies. Accordingly, in at least some regions, communication in such frequency bands is subject to various rules and regulations that may be designed at least in part to balance efficient medium use with fair use between the various parties that may potentially be contending for medium access.

In some regions and/or for certain spectrum portions, such rules and regulations may include mandating of a listen-before talk (LBT) policy in unlicensed spectrum. The LBT policy may require that wireless devices check whether the medium is busy, for example by performing energy sensing, wireless signal detection, etc., before transmitting on the medium, such as to reduce the likelihood of multiple transmissions overlapping in time and frequency and thus causing interference with each other. The LBT policy may be implemented in a variety of ways; for example, there may be a variety of possible protocols that provide and/or support LBT functionality, such as clear channel assessment (CCA) or extended clear channel assessment (eCCA), among various other possibilities.

In some regions and/or for certain spectrum portions, it may also be possible that LBT is not mandated in unlicensed spectrum. For such regions, the possibility for interference and competition for medium usage may be managed by dynamic (e.g., autonomously imposed) LBT use, and/or using other interference mitigation techniques. For example, it may be possible that if little or no other medium use is detected, a wireless device (such as a BS in a cellular communication system) could determine to not use LBT, while if significant other medium use is detected, the wireless device could determine to use LBT.

As previously noted herein, cellular communication may commonly rely significantly on reference signals for a variety of purposes. When LBT is in use, however, there may be instances in which conventional reference signal transmission is not performed because of the LBT (e.g., if a cell is in a backoff period waiting to acquire channel occupancy time, and/or if the medium is determined to be busy based on energy sensing). This can create uncertainty at the wireless devices that are using those reference signals, for example as to whether not receiving an expected reference signal is due to the cellular base station not transmitting the reference signal because of LBT, or due to poor link quality.

In at least some instances, it may be possible that signaling that meets certain configured requirements is exempt from LBT requirements. Such control signaling may be referred to as "short control signaling" herein. As one possible example, signaling that occupies the medium for a relatively small proportion of the time (e.g., 10% over any given 100 ms observation window, as one possibility; other definitions are also possible) may be allowed to be performed without first acquiring channel occupancy time through a LBT procedure even in LBT mandated regions, at least in some embodiments. Use of such short control signaling for at least some types of control signaling for cellular communication in unlicensed spectrum may accordingly help reduce uncertainty at wireless devices regarding such reference signals, at least in some instances. However, it may also be preferable in some instances for reference signals to be communicated in a manner that does not conform to short control signaling requirements, for example, in at least some scenarios in which LBT is not required and such restrictions would limit the scheduling flexibility of the cellular base station.

Thus, given that there may be a variety of possible scenarios for cellular communication in unlicensed spectrum, including when LBT is or is not in use, and/or when short control signaling is or is not in use for any of a variety of possible types of control signaling, it may be beneficial to specify techniques for configuring listen before talk and short control signaling in unlicensed spectrum. To illustrate one such set of possible techniques, FIG. 5 is a flowchart diagram illustrating a method for configuring listen before talk and short control signaling in unlicensed spectrum in a wireless communication system, at least according to some embodiments.

Aspects of the method of Figure 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TC states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

The wireless link(s) may include a wireless link that is established with the cellular base station on a cell in unlicensed spectrum. For example, such a wireless link may be configured as a secondary cell in a carrier aggregation scenario. As another possibility, such a link may be established as a primary cell, e.g., with a standalone cell that is deployed on an unlicensed frequency band. The cell in unlicensed spectrum may operate in a region and/or spectrum portion in which LBT is mandated, or may operate in a region and/or spectrum portion in which LBT is not mandated.

In 504, the wireless device may receive LBT configuration information from the cellular base station. The LBT configuration information may indicate whether LBT is configured for the wireless link. This may include indicating whether LBT is mandated for the cell. For example, indicating that LBT is mandated for the cell may serve as the indication that LBT is configured for the wireless link. The LBT configuration information may additionally or alternatively include various other types of information. For example, if the LBT configuration indicates that LBT is not mandated for the cell, the LBT configuration information may further provide cell-specific and/or wireless device specific LBT configuration information. The cell-specific LBT configuration information could include whether the cell is operating in a no LBT mode, whether LBT is being performed by the cellular base station before transmitting, whether all wireless devices served by the cell are to perform LBT before transmitting, and/or various other types of information. Such information may be broadcast in cell system information or provided to wireless devices in common RRC signaling, among various possibilities. In some instances, the cell-specific LBT configuration information may include an indication that LBT configuration for wireless devices is performed at a wireless device specific level. The wireless device specific LBT configuration information could include an indication of whether the wireless device (e.g., individually, for example due to the specific channel conditions at the wireless device) is configured to perform LBT before transmitting. Such information may be provided in dedicated RRC control signaling, media access control (MAC) control element (CE) signaling, and/or downlink control information (DCI) signaling, as various possibilities.

The cellular base station may determine whether to enable LBT (e.g., on a cell wide basis and/or for specific wireless devices served by the cell) based on any of a variety of possible considerations. In at least some instances, such considerations could include layer 3 (L3) received signal strength indicator (RSSI) information and/or channel occupancy information (potentially including directional L3 RSSI), and/or layer 1 (L1) RSSI information. In some instances, dynamic enabling/disabling of LBT at a wireless device using MAC CE or DCI signaling may be possible if L1 RSSI information is available (e.g., as part of AP-CSI-RS or as part of data scheduling). In some instances, a wireless device may provide a capability indication indicating whether it is capable of performing LBT. In such a scenario, such information may be considered by the cellular base station when determining whether to enable LBT; for example, if a wireless device indicates that it can not perform LBT, the cellular base station may determine to not enable LBT for uplink communications for that wireless device, at least in some instances.

In 506, the wireless device may receive short control signaling configuration information from the cellular base station. The short control signaling configuration information may indicate whether short control signaling is enabled for one or more types of control signaling, and/or for one or more control signaling resources.

For example, as one possibility, the short control signaling configuration information may indicate whether short control signaling is enabled for radio link monitoring (RLM) reference signals (RS). As another possibility, the short control signaling configuration information may indicate whether short control signaling is enabled for beam failure detection (BFD) RS and/or candidate beam detection (CBD) RS. As still a further possibility, the short control signaling configuration information may indicate whether short control signaling is enabled for sounding reference signals (SRS). For example, in configuration information for any or all such reference signals, in addition to various other parameters and configuration settings, the cellular base station may provide an indication of whether short control signaling is enabled. Other types of reference signals may also or alternatively be indicated to be enabled as short control signaling in a similar manner, as desired. Note that is may be possible that short control signaling can only be enabled when SSB are used as the RS for a given function, or it may be possible that short control signaling can be enabled when either of SSB or CSI-RS are used as the RS for a given function, according to various embodiments.

In some instances, it may be possible that certain RS resources are configured to be transmitted as short control signaling. For example, the short control signaling configuration information may indicate that one or more non-zero-power (NZP) CSI-RS resources are configured to be transmitted as short control signaling. In such a scenario, any type of RS (e.g., including RLM RS, BFD RS, CBD RS) that are configured on those resources may implicitly be configured as having short control signaling enabled. Such configuration of selected RS resources as short control signaling may be performed while also configuring other RS resources as non short control signaling, if desired, at least according to some embodiments.

In some embodiments, the short control signaling configuration information may include information indicating whether short control signaling is used for radio resource management (RRM) or mobility measurement timing configuration, and/or in conjunction with any of various other possible timing configurations. Such information may be used by the wireless device to determine whether to extend the corresponding RRM or mobility measurement timing, for example including determining the length of time over which cell measurements are performed for reference signal transmissions for RRM or mobility. For example, if short control signaling is not enabled for RRM/mobility measurements and LBT is enabled, the wireless device may determine to extend the time over which RRM/mobility measurements are performed to account for any missed opportunities to perform RRM/mobility measurements because of missed reference signal transmissions due to LBT. Following the same example, if short control signaling is enabled for RRM/mobility measurements or LBT is not enabled, the wireless device may determine to not extend the time over which RRM/mobility measurements are performed. e.g., as in such a scenario it may be the case that no reference signal transmissions are missed due to LBT.

Note that when RRM/mobility measurements extensions (and/or other measurement timing extensions that may be implemented based at least in part on whether short control signaling is enabled for references signals applicable to those measurement timing configurations) are implemented in certain frequency ranges, such as those in which beamforming may be used (e.g., 60 GHz, as one possibility), the length of those measurement timing extensions may depend on a number of beams configured. For example, in some instances, for each reference signal instance missed due to LBT, the amount of time by which the measurement timing is extended may be a certain configured or specified amount multiplied by the number of beams configured for the reference signal.

In some embodiments, it may additionally or alternatively be possible that the cellular base station is able to determine whether one or more neighbor cells have LBT enabled and/or are performing reference signal communications as short control signaling. In such a scenario, it may further be possible that the cellular base station can configure measurement gaps (e.g., for wireless devices to perform neighbor cell measurements) based at least in part on whether a neighbor cell has LBT enabled and/or is performing certain reference signal communications as short control signaling. For example, if LBT is used and short control signaling is not enabled for reference signals that would be measured by a wireless device, the cellular base station may configure a longer measurement gap than if LBT is not used and/or short control signaling is enabled for reference signals that would be measured by the wireless device. Such an approach may allow sufficient time for performing neighbor cell measurements in case some potential reference signal transmissions by the neighbor cell are missed due to LBT when needed, while also potentially avoiding providing a longer-than-needed (and thus potentially inefficient) measurement gap when it can be expected that no neighbor cell reference signal transmissions will be missed due to LBT, at least in some instances.

In some embodiments, it may be possible that coreset 0 and/or system information block (SIB) 1 transmissions can be configured as short control signaling. For example, the short control signaling configuration information may include a (e.g., 1 bit) indication in a master information block (MIB) indicating whether coreset 0/SIB1 is transmitted as short control signaling, for 3GPP multiplexing pattern 1, as one possibility.

In 508, the wireless device and the cellular base station may perform short control signaling. This may include the cellular base station transmitting one or more reference signals for which short control signaling has been indicated to be enabled as short control signaling. For example, if short control signaling is enabled for RLM RS, BFD RS, CBD RS, RS for RRM or mobility, etc., and/or for certain specific RS resources, the cellular base station may transmit those reference signals as short control signaling, and the wireless device may receive those reference signals that were transmitted as short control signaling. Additionally or alternatively, this may include the wireless device transmitting one or more reference signals for which short control signaling has been indicated to be enabled as short control signaling. For example, if short control signaling is enabled for SRS, the wireless device may transmit those reference signals as short control signaling, and the cellular base station may receive those reference signals that were transmitted as short control signaling.

Performing the short control signaling may also or alternatively include transmitting one or more other signals as short control signaling. For example, as previously noted, in some instances, coreset 0 and/or SIB 1 may be configured as short control signaling. In such a scenario, the cellular base station may transmit the coreset 0 and/or SIB 1 as short control signaling, and the wireless device may receive the coreset 0 and/or SIB 1 that were transmitted as short control signaling.

As previously noted, signals configured to be transmitted as short control signaling, and correspondingly transmitted as short control signaling, may conform to conditions configured for exemption from LBT requirements to be transmitted in unlicensed spectrum. As one possible such set of conditions, the short control signaling may be limited to no more than 10% channel occupancy over a 100 ms window. In some embodiments, for a wireless device or cellular base station (e.g., UE or gNB) that performs eCCA before a scheduled transmission, and for which eCCA is successful and COT is acquired, it may be the case that any transmitted signals inside the COT are not counted into the short control signaling limitation. Other channel occupancy limits, other observation windows, and/or other conditions altogether, are also possible conditions or sets of conditions that could be used to define short control signaling, according to various embodiments.

In various scenarios, the short control signaling may or may not be multiplexed with other transmissions. According to some embodiments, in a scenario in which the short control signaling is performed outside of an acquired channel occupancy time (COT)(e.g., if no LBT procedure has been performed to obtain medium access), the short control signaling that is performed outside of COT may not be multiplexed with non short control signaling transmissions. If the short control signaling is performed within an acquired COT, whether the short control signaling is multiplexed with other (e.g., non short control signaling) may depend on the type of COT and possibly the transmission directions of the signals under consideration for multiplexing. For example, as one possibility, when the short control signaling performed includes short control signaling that is performed within an omni directional COT or quasi-omni directional COT, the short control signaling that is performed within the omni directional COT or quasi-omni directional COT may be multiplexed with non short control signaling transmissions. Similarly, when the short control signaling performed includes short control signaling that is performed within a directional or multi-beam COT for a transmission control indicator (TCI) state that is associated with the directional or multi-beam COT, the short control signaling may be multiplexed with non short control signaling transmissions. At least in some embodiments, when the short control signaling performed includes short control signaling that is performed within a directional or multi-beam COT for a TCI state that is not associated with the directional or multi-beam COT, the short control signaling that is performed within the directional or multi-beam COT for the TCI state that is not associated with the directional or multi-beam COT may also be multiplexed with non short control signaling transmissions, with the non short control signaling transmissions and the short control signaling transmissions being rate matched.

Thus, at least according to some embodiments, the method of FIG. 5 may be used to provide a framework according to which listen before talk and/or short control signaling can be configured in unlicensed spectrum, which may increase the spectrum use efficiency, reduce power consumption, and/or provide any of various other possible benefits for cellular network communication in unlicensed spectrum, at least in some instances.

ADDITIONAL INFORMATION

The following additional information describes further aspects that might be used in conjunction with the method of FIG. 5 if desired. It should be noted, however, that the exemplary details provided herein below are not intended to be limiting to the disclosure as a whole: numerous variations and alternatives to the details provided herein below are possible and should be considered within the scope of the disclosure.

Channel access mechanisms for beam based operation in relatively high frequency unlicensed spectrum portions (such as between 52.6 GHz and 71 GHz, as one possibility) that comply with regulatory requirements may be important to specify for cellular communication technologies for which communication in such spectrum portions is desired. Such mechanisms could include LBT and no-LBT related procedures. For no-LBT cases, it may be possible that no additional channel sensing mechanism is specified. The LBT cases could include the use of omni-directional LBT and/or directional LBT techniques.

For regions in which regulatory requirements do not mandate LBT, such that it is possible that cellular communication could be performed with or without LBT, it may be useful to provide signaling mechanisms capable of indicating whether a given gNB-UE connection is operating in a LBT mode or a no-LBT mode. Such signaling mechanisms may include support for both cell specific gNB indications (e.g., common for all UEs in a cell, such as could be provided as part of system information, dedicated RRC signaling, etc.) and/or UE specific gNB indications (e.g., which can be different for different IUEs in a cell, and can be signaled using UE-specific RRC configuration information), according to various embodiments.

In some instances, it may be possible to apply contention exempt short control signaling regulatory rules for the transmission of certain cellular control signals, such as for synchronization signals (SS)/physical broadcast channel (PBCH) in the downlink and/or certain random access channel (RACH) procedure messages (e.g., message 1 for a 4 step RACH procedure and message A for a 2 step RACH procedure, among other possibilities) in the uplink. At least according to some embodiments, control signaling may be considered short control signaling if the control signaling occupies up to (but no more than) 10% of any given 100 ms observation window. Important considerations for designing control information framework to which the contention exempt short control signaling regulatory rules can apply in a cellular communication system could include what other downlink signals and channels can be multiplexed with SS/PBCH transmissions under contention exempt short control signaling rules, whether such rules can be applied to all supported subcarrier spacing (SCS) configurations to certain specific SCS configurations, whether short control signaling can be extended to include discovery burst signaling, and/or which downlink/uplink signals/channels (e.g., PDCCH, broadcast PDSCH, PDSCH without user plain data CSI-RS, PRS, 4 step RACH procedure message 3, SRS, PUCCH, PUSCH without user plain data, etc.) can be transmitted in unlicensed spectrum without LBT under the contention exempt short control signaling rules.

SSB and CSI-RS based radio link monitoring (RLM) procedures (e.g., such as described in 3GPP TS 38.213 and 38.113) may be used to maintain the radio link between a UE and a gNB. When LBT is enabled, there may be uncertainty in RLM procedures since the UE may be unable to differentiate whether the reference signals are not transmitted due to LBT (e.g., if the channel is otherwise occupied, preventing transmission of the reference signals), or are not received due to poor link quality. Accordingly, RLM procedures may benefit from supporting signaling whether RLM RS are being transmitted as short control signaling (e.g., which may not be subject to LBT before transmission), e.g., as such signaling may reduce this potential uncertainty.

SSB and CSI-RS based beam failure detection (BFD) and candidate beam detection (CBD) for beam management procedures may be used to detect when beam failure has occurred and to identify one or more potential candidate beams for beam failure recovery. According to some embodiments BFD may be evaluated over a configured RS set q_0, while CBD may be evaluated over a configured RS set q_1. When LBT is used for BFD and CBD, there may also be uncertainty in the beam management procedures, e.g., as similar to in RLM procedures, it may be possible that the UE is unable to differentiate whether the reference signals are not transmitted due to LBT or are not received due to poor link quality. Accordingly, signaling whether BFD/CBD RS are transmitted as short control signaling can be defined and used to potentially reduce this uncertainty, at least according to some embodiments.

As one possibility for providing support for signaling whether LBT or no-LBT operation is in effect, a gNB may provide cell specific signaling in system information. For example, in ServingCellConfigCommonSIB, and ServingCellConfigCommon, the following information regarding extended clear channel assessment (eCCA) could be provided:

```
channelAccessMode-r17   CHOICE {
eCCA NULL,
noLBTConfig    noLBTConfig    Optional
}
noLBTConfig ::= SEQUENCE {
noLBT          NULL
eCCA-gNB       BOOLEAN    Optional
eCCA-UE        BOOLEAN    Optional
eCCAConfig-UE  BOOLEAN    Optional
```

In this example, "eCCA" may indicate that the cell is operating in a region where LBT is mandated; "noLBTConfig" may be used to configure a cell that is operating in a region where LBT is not mandated; "noLBT" may indicate that a cell is operating in LBT mode; "eCCA-gNB" may be used to indicate that a gNB can perform eCCA before transmission by implementation; "eCCA-UE" may be used to configure UEs to perform eCCA before transmission; "eCCAConfig-UE" may be used to indicate that UE specific signaling may be used to configure a link as LBT enabled, where if no UE specific LBT configuration is sent, no LBT is used for the UE. As an extension, it may be possible that MAC CE or DCI could be used to dynamically activate LBT for a UE, e.g., based on interference conditions. Note that while this example signaling is provided as one possibility, numerous other variations and alternatives for signaling her LBT or no-LBT operation is in effect are also possible and should be considered within the scope of this disclosure.

According to some embodiments, a gNB operating in a region where LBT is not mandated may determine whether to enable UE eCCA based on any of various possible considerations. Such considerations could include L3-RSSI report and channel occupancy (potentially including directional L3-RSSI information), L1-RSSI report information, etc. If L1-RSSI as part of AP-CSI-RS is configured, the gNB may be able to dynamically trigger a UE to perform LBT using MAC CE signaling. If L1-RSSI is part of data scheduling, it may be possible that a gNB can dynamically trigger a UE to perform LBT using DCI.

CSI-RS can be used for many purposes. In some instances, it may be the case that short control signaling can only be applied to RLM RS in RadioLinkMonitoringRS configuration. When SSB is used as RLM RS, if short control signaling is in effect for SSB in general, the same may apply to the RLM RS. In some instances, enabling short control signaling for SSB may be implemented implicitly when discovery burst transmission window (DBTW) is not enabled, other techniques for enabling short control signaling for SSB are also possible. When CSI-RS is configured as RLM RS, short control signaling usage can be configured for the RLM RS by providing an indication of such in RLM configuration information, for example using the following configuration information. Note that as one possibility, when no RLM RS is explicitly configured, short control signaling may be enabled for p-CSI-RS with the same active TCI state with the PDCCH. In some instances, when RLM RS is explicitly configured, short control signaling can be enabled per detection resource.

```
RadioLinkMonitoringConfig ::= SEQUENCE {
failureDetectionResourcesToAddModList
SEQUENCE(SIZE(1..maxNrofFailureDetectionResources)) OF
RadioLinkMonitoringRS
           OPTIONAL, -- Need N
failureDetectionResourcesToReleaseList
SEQUENCE(SIZE(1..maxNrofFailureDetectionResources)) OF
RadioLinkMonitoringRS-Id
           OPTIONAL, -- Need N
beamFailureInstanceMaxCount   ENUMERATED (n1, n2, n3, 04, n5, n6,
n8, n10}            OPTIONAL, -- Need R
beamFailureDetectionTimer   ENUMERATED {pbfd1, pbfd2, pbfd3,
pbfd4, pbfd5, pbfd6, pbfd8, pbfd10}
           OPTIONAL, -- Need R ...
ShortControlSignalingEnabled   BOOLEAN   OPTIONAL,
}
RadioLinkMonitoringRS ::= SEQUENCE {
RadioLinkMonitoringRS-Id RadioLinkMonitoringRS-Id, purpose
ENUMERATED {beamFailure, rlf, both},
detectionResource   CHOICE {
ssb-Index SSB-Index,
csi-RS-Index NZPOCSI-RS-ResourceId
csi-RS-ShortControlSignalingEnabled   BOOLEAN },
...
}
```

For beam management, when SSB is used as BFD/CBD RS, if short control signaling is in effect for SSB in general, the same may apply to the BFD/CBD RS. In some instances, enabling short control signaling for SSB may be implemented implicitly when discovery burst transmission window (DBTW) is not enabled; other techniques for enabling short control signaling for SSB are also possible. When CSI-RS is configured as BFD/CBD RS, short control signaling usage can be configured for the BFD/CBD RS by providing an indication of such in beam management configuration information, for example using the following configuration information. Note that it may be possible to enabled all or part of CSI-RS resource ID as short control signaling, e.g., due to overhead limitations.

```
BFR-SSB-Resource ::= SEQUENCE {
   ssb        SSB-Index,
   ra-PreambleIndex   INTEGER (0, 63),
   ...
}
```

-continued

```
BFR-CSIRS-Resource ::= SEQUENCE {
    csi-RS      NZP-CSI-RS-ResourceID,
    csi-RS-ShortControlSignalingEnabled    BOOLEAN
    ra-OccasionList   SEQUENCE(SIZE(1..maxRA-
OccasionsPerCSIRS)} OF INTEGER (0..maxRA-
Occasions-1)  OPTIONAL,
    ra-PreambleIndex        INTEGER (0, 63),
    ...
}
CandidateBeamRS-r16 ::= SEQUENCE {
candidateBeamConfig-r16  CHOICE {
    ssb-r16     SSB-Index,
    csi-RS-r16  NZP-CSI-RS-ResourceId,
},
    csi-RS-ShortControlSignalingEnabled  BOOLEAN   OPTIONAL,
    servingCellId ServCellIndex  OPTIONAL
}
```

It may also be possible to configure short control signaling in NZP-CSI-RS-Resource configuration itself. For example, some NZP-CSI-RS-ResourceID may be explicitly configured as short control signaling transmissions. This may apply to periodic or aperiodic CSI-RS transmission. As an extension, it may be applied to semi-persistent CSI-RS, and whether the short control signaling is enabled or not may be configured by RRC or MAC CE signaling that is used to activate the semi-persistent CSI-RS. As one possibility, the following configuration information could be used to configure NZP-CSI-RS-Resources directly as short control signaling transmissions.

```
NZP-CSI-RS-Resource ::= SEQUENCE {
    nzp-CSI-RS-ResourceID           NZP-CSI-RS-ResourceId,
    resourceMapping                 CSI-RS-ResourceMapping.
    powerControlOffset              INTEGER (-8...15),
    powerControlOffsetSS            ENUMERATED {db-3, db0, db3;
db6}  OPTIONAL, -- Need R
    scramblingID                    ScramblingId,
    periodicityAndOffset            CSI-
ResourcePeriodicityAndOffset       OPTIONAL, -
    qcl-InfoPeriodicCSI-RS          TCI-StateId   OPTIONAL,
-- Cond Periodic
    csi-RS-ShortControlSignalingEnabled     BOOLEAN
OPTIONAL, -- Cond DynamicAccess
    ...
}
```

It may also be possible to configure SRS transmission as short control signaling, for example using the following RRC configuration:

```
SRS-Resource ::= SEQUENCE {
srs-ResourceId    SRS-ResourceId
nrofSRS-Ports     ENUMERATED {port1, ports2, ports4},
........
srsShortControlSignalingEnabled  BOOLEAN  OPTIONAL,
}
```

As previously noted herein, another consideration for providing a framework that supports short control signaling for cellular communications may include which signaling/channels can be transmitted together with short control signaling. According to some embodiments, when transmitting outside of an acquired channel occupancy time (COT), it may be the case that only RRC configured CSI-RS/SRS with short control signaling is transmitted. e.g., such that there may be no uni-cast PDSCH transmission. When transmitted inside an acquired COT, for omni-quasi-omni COT, it may be possible that any signal including uni-cast PDSCH can be multiplexed with CSI-RS and SRS that are configured as short control signaling. For directional/multi-beam COT acquired through directional LBT, if the associated TCI state of the CSI-RS is covered by the LBT sensing beam, similar to omni/quasi-omni COT, any signal including uni-cast PDSCH can be multiplexed with CSI-RS and SRS that are configured as short control signaling. If the associated TCI state of the CSI-RS/SRS is not covered by the LBT sensing beam, the CSI-RS/SRS may be transmitted as short control signaling, and PDSCH rate matching for the p-CSI-RS or sp-CSI-RS symbol with the rateMatchPattern configuration in PDSCH-Config or ServingCellConfigCommon configuration information may be used. It may be the case that CSI-RS/SRS not configured as short control signaling can not be transmitted in the directional COT if the associated TCI state is not covered by the LBT sensing beam. In such a case, the PDSCH may still rate match the CSI-RS even if it is not transmitted with the RRC configured rateMatchPattern. As another possibility, in such a case, the gNB may be able to dynamically indicate that the PDSCH can be transmitted on the CSI-RS resource elements in DCI. As a still further possibility, the UE may always assume that the PDSCH is transmitted on periodic/semi-persistent CSI-RS RE in such a case, e.g., similar to for AP-CSI-RS.

For CoreSet 0 and SIB1 transmission, if multiplexing pattern 3 is used, the transmissions can follow the same rules as SSB, at least according to some embodiments. For multiplexing pattern 1, if short control signaling is not in effect for SSB in general, CoreSet 0 and SIB transmission may apply LBT by default (e.g., not as short control signaling). If short control signaling is in effect for SSB in general, whether CoreSet 0/SIB1 transmission is performed as short control signaling may be signaled in the master information block (MIB). One bit may be used to indicate whether CoreSet 0/SIB1 is transmitted as short control signaling, at least as one possibility. It may be possible to support UE flexibility to decode either 1 SIB1 transmission (e.g., corresponding to the best SSB direction), or to combine multiple SIB1 instances received across different SSB directions. As previously noted herein, in some instances, enabling short control signaling for SSB may be implemented implicitly when discovery burst transmission window (DBTW) is not enabled; other techniques for enabling short control signaling for SSB are also possible. It may also be possible (e.g., if DBTW is supported but signaled as not used, as one possibility) that CoreSet 0 and SIB1 are not transmitted as short control signaling by default, and/or that additional signaling in the MIB can be provided to indicate whether CoreSet 0 and SIB1 are transmitted as short control signaling.

In some instances, RRC configuration may be used to indicate whether short control signaling is used for the SSB-based RRM Measurement Timing Configuration (SMTC). Note that in some instances, when such short control signaling is used, or regulation does not require LBT, it may be the case that DBTW is disabled. As one possible example, the following configuration information could be used.

```
SSB-MTC ::= SEQUENCE {
periodicityAndOffset CHOICE {
sf5 INTEGER (0..4),
sf10 INTEGER (0..9),
sf20 INTEGER (0..19),
sf40 INTEGER (0..39),
sf80 INTEGER (0..79),
```

```
sf160 INTEGER (0..159),
},
duration ENUMERATED {sf1, sf2, sf3, sf4, s13}
DBTW ENUMERATED (enabled, disabled)
}
SSB-MTC2 ::= SEQUENCE {
pci-List SEQUENCE (SIZE (1..maxNrofPCIsPerSMTC)) OF PhysCellId
OPTIONAL, -- Need M
periodicity ENUMERATED {st5, sf10, sf20, sf40, sf80, spare3, spare2,
spare1}
DBTW ENUMERATED {enabled, disabled}
}
SSB-MTC2-LP-r16 ::= SEQUENCE {
pci-List SEQUENCE (SIZE (1..maxNrofPCIsPerSMTC)) OF PhysCellId
OPTIONAL, -- Need R
periodicity ENUMERATED {sf10, sf20, sf40, sf80, sf160, spare3, spare2,
spare1}
DBTW ENUMERATED {enabled, disabled}
}
SSB-MTC-r16 ::= SEQUENCE {
periodicityAndOffset-r16   CHOICE {
sf5-r16 INTEGER (0..4),
sf10-r16 INTEGER (0..9),
sf20-r16 INTEGER (0..19),
sf40-r16 INTEGER (0..39),
sf80-r16 INTEGER (0..79),
sf160-r16 INTEGER (0..159),
sf320-r16 INTEGER (0..319),
sf640-r16 INTEGER (0..639),
sf1280-r16 INTEGER (0..1279),
}
duration-r16 ENUMERATED {sf1, sf2, sf3, sf4, sf5}
pci-List-r16 SEQUENCE (SIZE (1..maxNrofPCIsPerSMTC)) OF
PhysCellId
OPTIONAL, -- Need M
ssb-ToMeasure-r16 SetupRelease (SSB-ToMeasure} OPTIONAL - Need M
DBTW ENUMERATED {enabled, disabled}
}
```

Mobility object configuration also can indicate whether short control signaling is used. In some instances, when short control signaling is used, no DBTW is enabled. The SSB may be guaranteed to be transmitted in such a scenario. As an example, the following configuration information could be used, at least as one possibility.

```
SSB-ConfigMobility ::= SEQUENCE {
ssb-ToMeasure SetupRelease {SSB-ToMeasure} OPTIONAL - Need M
deriveSSB-IndexFromCell   BOOLEAN,
ss-RSSI-Measurement      SS-RSSI-Measurement OPTIONAL, -- Need M
...,
[[
ssb-PositionQCL-Common-r16 SSB-PositionQCL-Relation-r16
OPTIONAL,
-- Cond SharedSpectrum
ssb-PositionQCL-CellsToAddModList-r16      SSB-PositionQCL-
CellsToAddModList-r16 OPTIONAL, -- Need N
ssb-PositionQCL-CellsToRemoveList-r16 PCI-List OPTIONAL - Need N
]]
DBTW ENUMERATED {enabled, disabled}
}
```

A similar technique may be used for CSI-RS based measurement, e.g., for CSI-RS transmissions that qualify as short control signaling.

For UE mobility in the 60 GHz frequency range, it may be possible that a $T_{interrupt}$ parameter is configured as follows:

$$T_{interrupt} = T_{search} + T_{IU} + [20] + T_A \, ms$$

When short control signaling is applied (e.g., when DBTW is disabled), it may be possible that a UE follows FR2 handover requirements, e.g., without any LBT related extension to $T_{search}$ and $T_A$ values.

In unlicensed spectrum, it may be possible that measurement requirements are relaxed (extended), e.g., to account for LBT related considerations, at least when short control signaling is not applied (e.g., when DBTW is enabled). In such a scenario, it may be possible that SSB may not be transmitted due to LBT, and so an extension can be applied for handover requirements. For example, as one set of possible extension definitions, the following modified $T_{search}$ values can be used.

If the target cell is an unknown intra-frequency cell and the target cell Es/Iot≥{−2} dB:

$$T_{search} = N*[(1+L_1)*T_{rs}+2] ms$$

If the target cell is an unknown inter-frequency cell and the target cell Es/Iot≥{−2} dB:

$$T_{search} = N[(3+L_1')*T_{rs}+2] ms$$

where $L_1$ and $L_1'$ represent the number of DRS occasions missed due to DL LBT during the intra-frequency and inter-frequency detection period, respectively, and N is the number of receive beams to be used in the 60 GHz frequency range (as one possibility, the FR2 value N=8 may be reused). Note that in comparison to existing NR-U extensions, these measurement requirement extensions may further be extended based on this number of beams N, which may magnify the length of the extension considerably, though it may be possible that $L_1$ and $L_1'$ can be smaller than in NR-U in different frequency ranges due to lower LBT failure probability in 60 GHz. Note also that it may be possible that RACH procedure communications can be transmitted as short control signaling as well, with no LBT delay needed for $T_{IU}$ time as well.

Note that similar techniques for extending measurement requirements may also be applied for other types of measurements. For example, such techniques could be used for SSB based L1-RSRP measurement requirements (e.g., if short control signaling is used, follow an FR2 based approach without LBT related extensions and possibly with a different N value; if short control signaling is not used, LBT related extensions may be applied based on $N*L_1$, where a similar $L_1$ definition as already described herein may be used), SSB based RLM, SSB based BFD/CBD, intra-frequency measurement requirements, inter-frequency measurement requirements, and/or any of various other possible measurement requirements.

Additionally, if a gNB is aware of whether a neighbor cell SSB is transmitted as short control signaling, the gNB may be able to configure measurement gaps accordingly, at least according to some embodiments. For example, when LBT is not used (e.g., if DBTW is disabled), the measurement gap can be configured per SCS for SSB transmission+switching time. If LBT is used (e.g., if DBTW is enabled), since DBTW can be up to 5 ms (with Q SSB candidate per beam), the measurement gap may be 5 ms+switching time.

In the following further exemplary embodiments are provided.

One set of embodiments may include an apparatus, comprising: a processor configured to cause a wireless device to: establish a wireless link with a cellular base station on a cell in unlicensed spectrum: receive listen-before-talk (LBT) configuration information, wherein the LBT configuration information indicates whether LBT is configured for the wireless link; receive short control signaling configuration information, wherein the short control signaling configuration information indicates whether short control signaling is enabled for one or more types of control signaling; and perform short control signaling with the cellular base station on the wireless link when short control signaling is enabled.

According to some embodiments, the LBT configuration information indicates whether the cell is operating in a region where LBT is mandated.

According to some embodiments, if the LBT configuration information indicates that the cell is not operating in a region where LBT is mandated, the LBT configuration information further indicates one or more of: whether the cell is operating in a no LBT mode; whether LBT is performed by the cellular base station before transmission; whether all wireless devices served by the cell are to perform LBT before transmission; or whether wireless device specific LBT configuration signaling is enabled.

According to some embodiments, the short control signaling configuration information indicates that short control signaling is used for one or more of radio resource management (RRM) or mobility measurement timing configuration, wherein the short control signaling performed with the cellular base station on the wireless link when short control signaling is enabled includes reception of one or more of RRM or mobility measurement transmissions as short control signaling.

According to some embodiments, the processor is further configured to cause the wireless device to: determine whether to extend a length of one or more cell measurements based at least in part on the whether short control signaling is enabled for one or more on which the one or more cell measurements are based.

According to some embodiments, the short control signaling configuration information indicates that sounding reference signal (SRS) transmissions am configured as short control signaling, wherein the short control signaling performed with the cellular base station on the wireless link when short control signaling is enabled includes transmission of one or more SRS as short control signaling.

According to some embodiments, the short control signaling is limited to no more than 10% channel occupancy over a 100 ms observation window.

Another set of embodiments may include a wireless device, comprising: an antenna; a radio operably coupled to the antenna; and a processor operably coupled to the radio; wherein the wireless device is configured to: establish a wireless link with a cellular base station in unlicensed spectrum: receive short control signaling configuration information, wherein the short control signaling configuration information indicates whether short control signaling is enabled for one or more types of control signaling; and perform short control signaling with the cellular base station on the wireless link when short control signaling is enabled.

According to some embodiments, the wireless device is further configured to: receive listen-before-talk (LBT) configuration information, wherein the LBT configuration information indicates whether LBT is configured for the wireless link.

According to some embodiments, the short control signaling performed includes short control signaling that is performed outside of channel occupancy time (COT), wherein the short control signaling that is performed outside of COT is not multiplexed with non short control signaling transmissions.

According to some embodiments, the short control signaling performed includes short control signaling that is performed within an omni directional channel occupancy time (COT) or quasi-omni directional COT, wherein the short control signaling that is performed within the omni directional COT or quasi-omni directional COT is multiplexed with non short control signaling transmissions.

According to some embodiments, the short control signaling performed includes short control signaling that is performed within a directional or multi-beam channel occupancy time (COT) for a transmission control indicator (TCI) state that is not associated with the directional or multi-beam COT, wherein the short control signaling that is performed within the directional or multi-beam COT for the TCI state that is not associated with the directional or multi-beam COT is multiplexed with non short control signaling transmissions that are rate matched with the short control signaling.

According to some embodiments, the short control signaling configuration information indicates that one or more of a coreset 0 transmission or a system information block (SIB) 1 transmission is configured as short control signaling, wherein the short control signaling performed with the cellular base station on the wireless link when short control signaling is enabled includes reception of one or more of a coreset 0 transmission or a SIB 1 transmission as short control signaling.

A further set of embodiments may include a cellular base station, comprising: an antenna a radio operably coupled to the antenna; and a processor operably coupled to the radio; wherein the cellular base station is configured to: establish a wireless link with a wireless device in unlicensed spectrum; provide short control signaling configuration information, wherein the short control signaling configuration information indicates that short control signaling is enabled for one or more types of control signaling: and perform short control signaling with the wireless device on the wireless link based at least in part on providing the short control signaling configuration information.

According to some embodiments, the cellular base station is further configured to: provide listen-before-talk (LBT) configuration information, wherein the LBT configuration information indicates whether LBT is configured for the wireless link, wherein the LBT configuration information includes one or more of cell specific LBT configuration information or wireless device specific specific LBT configuration information.

According to some embodiments, the cellular base station is further configured to: determine the LBT configuration information based on one or more of layer 3 received signal strength indicator (RSSI) and channel occupancy information or layer 1 RSSI information.

According to some embodiments, the short control signaling configuration information indicates that short control signaling is enabled for radio link monitoring (RLM) reference signals (RS), wherein the short control signaling performed with the wireless device on the wireless link includes transmission of RLM RS as short control signaling.

According to some embodiments, the short control signaling configuration information indicates that short control signaling is enabled for one or more of beam failure detection (BFD) reference signals (RS) or candidate beam detection (CBD) RS, wherein the short control signaling performed with the wireless device on the wireless link includes transmission of one or more of BFD RS or CBD RS as short control signaling.

According to some embodiments, the short control signaling configuration information indicates that one or more non-zero-power (NZP) channel state information (CSI) reference signal (RS) resources are configured to be transmitted as short control signaling, wherein the short control signaling performed with the wireless device on the wireless link when short control signaling is enabled includes transmission of the one or more NZP-CSI-RS resources as short control signaling.

According to some embodiments, the cellular base station is further configured to: determine whether one or more reference signals for a neighbor cell are transmitted as short control signaling; and configure a measurement gap for the wireless device for the neighbor cell based at least in part on whether the one or more reference signals for the neighbor cell are transmitted as short control signaling.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
 a processor configured to, when executing instructions stored in a memory, perform operations comprising:
  receive listen-before-talk (LBT) configuration information, wherein the LBT configuration information indicates whether LBT is configured for a wireless link with a cellular base station on a cell in unlicensed spectrum;
  receive short control signaling configuration information, wherein the short control signaling configuration information indicates whether short control signaling is not in use for one or more types of control signaling; and
  determine whether to extend a length of one or more interruption parameters of UE mobility based at least in part on whether short control signaling is not in use for the one or more types of control signaling.

2. The apparatus of claim 1,
 wherein the LBT configuration information indicates whether the cell is operating in a region where LBT is mandated.

3. The apparatus of claim 2, wherein if the LBT configuration information indicates that the cell is not operating in a region where LBT is mandated, the LBT configuration information further indicates one or more of:
 whether the cell is operating in a no LBT mode;
 whether LBT is performed by the cellular base station before transmission;
 whether all wireless devices served by the cell are to perform LBT before transmission; or
 whether wireless device specific LBT configuration signaling is in use.

4. The apparatus of claim 1,
 wherein the short control signaling configuration information indicates that short control signaling is used for one or more of radio resource management (RRM) or mobility measurement timing configuration,
 wherein the short control signaling performed with the cellular base station on the wireless link when short control signaling is in use includes reception of one or more of RRM or mobility measurement transmissions as short control signaling.

5. The apparatus of claim 1, wherein the operations further comprise:
 determine not to extend the length of one or more interruption parameters comprising not including an LBT delay associated with a random access channel (RACH) for a Tru time as part of determining an interruption time.

6. The apparatus of claim 1,
wherein the short control signaling configuration information indicates that sounding reference signal (SRS) transmissions are configured as short control signaling,
wherein the short control signaling performed with the cellular base station on the wireless link when short control signaling is in use includes transmission of one or more SRS as short control signaling.

7. The apparatus of claim 1,
wherein the short control signaling is limited to no more than 10% channel occupancy over a 100 ms observation window.

8. A method, comprising:
receive listen-before-talk (LBT) configuration information, wherein the LBT configuration information indicates whether LBT is configured for a wireless link with a cellular base station on a cell in unlicensed spectrum;
receive short control signaling configuration information, wherein the short control signaling configuration information indicates whether short control signaling is not in use for one or more types of control signaling; and
determine whether to extend a length of one or more interruption parameters of UE mobility based at least in part on whether short control signaling is not in use for the one or more types of control signaling.

9. The method of claim 8,
wherein the LBT configuration information indicates whether the cell is operating in a region where LBT is mandated.

10. The method of claim 9, wherein if the LBT configuration information indicates that the cell is not operating in a region where LBT is mandated, the LBT configuration information further indicates one or more of:
whether the cell is operating in a no LBT mode;
whether LBT is performed by the cellular base station before transmission;
whether all wireless devices served by the cell are to perform LBT before transmission; or
whether wireless device specific LBT configuration signaling is in use.

11. The method of claim 8,
wherein the short control signaling configuration information indicates that short control signaling is used for one or more of radio resource management (RRM) or mobility measurement timing configuration,
wherein the short control signaling performed with the cellular base station on the wireless link when short control signaling is in use includes reception of one or more of RRM or mobility measurement transmissions as short control signaling.

12. The method of claim 8, further comprising:
determining not to extend the length of one or more interruption parameters comprising not including an LBT delay associated with a random access channel (RACH) for a $T_{IU}$ time as part of determining an interruption time.

13. The method of claim 8,
wherein the short control signaling configuration information indicates that sounding reference signal (SRS) transmissions are configured as short control signaling,
wherein the short control signaling performed with the cellular base station on the wireless link when short control signaling is in use includes transmission of one or more SRS as short control signaling.

14. The method of claim 8,
wherein the short control signaling is limited to no more than 10% channel occupancy over a 100 ms observation window.

15. A method, comprising:
transmit, to a wireless device, listen-before-talk (LBT) configuration information, wherein the LBT configuration information indicates whether LBT is configured for a wireless link with the wireless device on a cell in unlicensed spectrum; and
transmit, to the wireless device, short control signaling configuration information, wherein the short control signaling configuration information indicates whether short control signaling is not in use for one or more types of control signaling, wherein the short control signaling configuration information is useable to determine whether to extend a length of one or more interruption parameters of UE mobility based at least in part on whether short control signaling is not in use for the one or more types of control signaling.

16. The method of claim 15,
wherein the LBT configuration information indicates whether the cell is operating in a region where LBT is mandated.

17. The method of claim 16, wherein if the LBT configuration information indicates that the cell is not operating in a region where LBT is mandated, the LBT configuration information further indicates one or more of:
whether the cell is operating in a no LBT mode;
whether LBT is performed before transmission;
whether all wireless devices served by the cell are to perform LBT before transmission; or
whether wireless device specific LBT configuration signaling is in use.

18. The method of claim 15,
wherein the short control signaling configuration information indicates that short control signaling is used for one or more of radio resource management (RRM) or mobility measurement timing configuration,
wherein the short control signaling performed on the wireless link when short control signaling is in use includes transmission of one or more of RRM or mobility measurement transmissions as short control signaling.

19. The method of claim 15,
wherein the short control signaling configuration information indicates that sounding reference signal (SRS) transmissions are configured as short control signaling,
wherein the short control signaling performed on the wireless link when short control signaling is in use includes reception of one or more SRS as short control signaling.

20. The method of claim 15,
wherein the short control signaling is limited to no more than 10% channel occupancy over a 100 ms observation window.

* * * * *

UNITED STATES PATENT AND TRADEMARK OFFICE
CERTIFICATE OF CORRECTION

PATENT NO.        : 12,144,023 B2
APPLICATION NO.   : 17/438242
DATED             : November 12, 2024
INVENTOR(S)       : Huaning Niu et al.

It is certified that error appears in the above-identified patent and that said Letters Patent is hereby corrected as shown below:

In the Claims

Column 29, Line 2, Claim 5 delete "Tru" and insert --$T_{IU}$--.
Column 29, Line 14, Claim 7 delete "100 ms" and insert --100ms--.
Column 30, Line 7, Claim 14 delete "100 ms" and insert --100ms--.
Column 30, Line 61, Claim 20 delete "100 ms" and insert --100ms--.

Signed and Sealed this
Eighteenth Day of March, 2025

Coke Morgan Stewart
*Acting Director of the United States Patent and Trademark Office*